United States Patent [19]

Mazza et al.

[11] 4,283,089

[45] Aug. 11, 1981

[54] PRETREATMENT FOR FRACTURING COAL SEAMS

[75] Inventors: Raymond L. Mazza, Morgantown, W. Va.; H. Douglas Dahl, Pittsburgh, Pa.; Ronald W. Umphrey, Fairmont, W. Va.

[73] Assignee: Conoco, Inc., Ponca City, Okla.

[21] Appl. No.: 158,669

[22] Filed: Jun. 12, 1980

[51] Int. Cl.³ ............................................. E21C 43/00
[52] U.S. Cl. ......................................... 299/16; 299/5; 166/307; 166/308
[58] Field of Search .................... 166/307, 308; 299/4, 299/5, 16; 241/1

[56] References Cited

U.S. PATENT DOCUMENTS

| | | | |
|---|---|---|---|
| 3,384,416 | 5/1968 | Ruehl | 299/16 |
| 3,814,480 | 6/1974 | Dahl | 166/308 |
| 3,918,761 | 11/1975 | Aldrich | 299/5 |

*Primary Examiner*—William F. Pate, III
*Attorney, Agent, or Firm*—Richard W. Collins

[57] ABSTRACT

A pretreatment for use in fracturing coal seams to increase gas permeability of the seams. The pretreatment involves injecting a material capable of swelling coal into a coal seam prior to fracturing the coal seam. The pretreatment material swells the coal and closes the natural cleats therein, enhancing the effectiveness of the subsequent fracturing step.

6 Claims, No Drawings

PRETREATMENT FOR FRACTURING COAL SEAMS

BACKGROUND OF THE INVENTION

Coal seams contain methane gas. In some cases, this gas is produced in commercial quantities. More often, the gas is not producible in commercial quantities, but is a hazard to mining operations. In such cases, the gas is often partially removed prior to or during mining operations by various known degasification procedures.

Fracturing of the coal seams is sometimes used to enhance the rate of gas production when the gas is to be produced, either commercially or for degasification purposes. However, most coal seams have a series of natural fractures, or cleats, which interfere with hydraulic fracturing processes. The present invention is directed to a procedure for reducing the effects of natural cleats on fracturing processes, and for enhancing the effectiveness of the fracturing processes.

A fracturing process for coal seams using a volatile liquid such as ammonia as the fracturing fluid is described in U.S. Pat. No. 3,384,416. A process involving injection of ammonia into a coal seam to cause the coal seam to shatter followed by blowing gas through the area of shattered coal to carry coal particles from the treated area is described in U.S. Pat. No. 3,815,826.

Conventional fracturing of coal seams involves injecting a fracturing fluid, with or without propping agents and fluid loss additives, under fracturing pressure into the coal seams. The fractures created increase the gas permeability in the treated area and enhance gas production or degasification.

Conventional fracturing of coal seams is of limited effectiveness if the treatment zone includes a natural fracture or cleat, as the cleat provides a path for the fracturing fluid and diminishes the extent of induced fractures. Fluid loss additives and the like are of limited effectiveness.

There has been a need for an improved method of fracturing coal seams which contain natural fractures in the treated area. Such a method is provided by the present invention.

SUMMARY OF THE INVENTION

According to the present invention, a coal seam which is to be subjected to hydraulic fracturing is first pretreated with a material which swells the coal. The swelling of the coal closes the natural fractures or cleats in the coal seam and prevents leakage of fracturing fluid during the subsequent hydraulic fracturing step, thereby enhancing the effectiveness of the hydraulic fracturing. The pretreatment material may be any fluid which is capable of swelling coal on contact. Preferred pretreatment materials are ammonia and hydrogen chloride. Liquid ammonia is the most preferred material.

The pretreatment fluid is injected into the coal seam at a pressure below the fracturing pressure and allowed to stand for a period of time sufficient to allow swelling of the coal. The pretreated coal seam is subsequently subjected to a conventional hydraulic fracturing treatment. The process of the invention enables formation of fractures in a direction away from the natural cleats, greatly increasing the drainage or production rate of methane from the treated area.

DESCRIPTION OF THE PREFERRED EMBODIMENT

The process of this invention is particularly useful in enhancing gas production from a coal seam and in enhancing degasification of a portion of a coal seam to be mined.

In cases where the primary object is gas production, such as from a methane rich coal seam which is not mineable, treatment wells are spaced in a pattern, such as uniformly on 40 to 80 acre spacing, and after carrying out the process of the invention the gas is produced in a conventional manner.

In a degasification operation, treatment wells are spaced about an area being mined or to be mined, preferably with a spacing of from 2 to 3 times the fracture length obtained from the treatment. Thus, if the fracture length produced from the treatment is 200 meters, the treatment well spacing would be from 400 to 600 meters between wells.

Preferably, in both the above situations, the treatment wells are located near a naturally occurring major or face cleat in the coal seam. This enables the pretreatment fluid to act primarily on the coal around the natural cleat, causing it to swell such that the subsequent hydraulic fracturing fluid will not pass easily through the natural cleat. Ideally, the induced fractures will be substantially perpendicular to the natural cleats, resulting in significantly enhanced gas production rates due to the increased permeability in all directions about the treatment zone.

The process of the invention, whether for gas production or degasification of a mineable seam, involves injecting a pretreatment fluid capable of swelling coal, shutting in the treatment zone for a period of time to enable the coal to swell (typically from 1 to 24 hours) and then subjecting the pretreated zone to a conventional hydraulic fracturing process. The pretreatment fluid must be injected at a pressure less than the fracturing pressure of the coal seam. The pretreated zone, after being shut off for a sufficient time to allow the coal in the pretreated area to swell and close the natural openings, is subjected to conventional hydraulic fracturing using gelled water or other fracturing fluid with or without propping agents such as sand particles. The fracturing treatment itself is not a part of the invention and can be any of several conventional hydraulic fracturing processes known in the art.

The most preferred pretreatment fluid is liquid ammonia, as it is an effective coal swelling agent and is somewhat easier to handle than, for example, hydrogen chloride. The number of treatment wells utilized is strictly a function of the area to be treated, and the volumes and pressures of pretreatment and fracturing fluids are functions of such things as coal seam thickness, seam depth, treatment well spacing, etc. The essential feature of the invention involves pretreating an area of a coal seam with a coal swelling fluid and allowing the pretreatment fluid to remain in contact with the coal seam for a period of time sufficient to enable swelling of the coal with resultant closing off of natural openings in the coal seam, followed by a conventional hydraulic fracturing process in the pretreated area.

The foregoing description of the preferred embodiments is intended to be illustrative rather than limiting, and numerous variations and modifications within the scope of the invention will be apparent to those skilled in the art.

We claim:

1. A method of pretreating and hyraulically fracturing a coal seam comprising:
   (a) injecting a pretreatment material capable of swelling coal into a coal seam to be fractured, said material being injected at less than fracturing pressure;
   (b) allowing the coal seam to swell as a result of contact with said material, thereby reducing the permeability of cleats in the pretreated portion of said coal seam; and
   (c) subsequently subjecting said pretreated portion of said coal seam to hydraulic fracturing.

2. The method of claim 1 wherein said pretreatment material is selected from the group consisting of ammonia and hydrogen chloride.

3. The method of claim 1 wherein said pretreatment material is liquid ammonia.

4. The method of claim 1 wherein methane gas is to be produced from said coal seam and said pretreatment and fracturing steps are applied to said coal seam in a pattern utilizing spacing of from 40 to 80 acres.

5. The method of claim 1 wherein said coal seam is to be mined and said pretreatment and fracturing steps are applied to said coal seam in a pattern outlining a portion of said coal seam to be mined utilizing a lineal spacing of from 2 to 3 times the length of fracture obtained.

6. The method of claim 5 wherein the pretreatment and fracturing steps are carried out near face cleats in the treated portion of the coal seam.

* * * * *